United States Patent
Zhong et al.

(10) Patent No.: US 11,556,735 B2
(45) Date of Patent: Jan. 17, 2023

(54) TRAINING DEVICE AND TRAINING METHOD FOR TRAINING MULTI-GOAL MODEL

(71) Applicant: FUJITSU LIMITED, Kawasaki (JP)

(72) Inventors: Chaoliang Zhong, Beijing (CN); Wensheng Xia, Beijing (CN); Ziqiang Shi, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 16/868,860

(22) Filed: May 7, 2020

(65) Prior Publication Data

US 2020/0356807 A1   Nov. 12, 2020

(30) Foreign Application Priority Data

May 9, 2019 (CN) .......................... 201910384143.X

(51) Int. Cl.
*G06K 9/62* (2022.01)
*G06N 20/00* (2019.01)

(52) U.S. Cl.
CPC ........... *G06K 9/6227* (2013.01); *G06K 9/626* (2013.01); *G06K 9/6257* (2013.01); *G06N 20/00* (2019.01)

(58) Field of Classification Search
CPC .... G06K 9/6227; G06K 9/6257; G06K 9/626; G06K 9/6256; G06N 20/00; G06N 3/006; G06N 7/005
See application file for complete search history.

(56) References Cited

U.S. PATENT DOCUMENTS

2019/0294922 A1* 9/2019 Clark .................... A63F 13/847
2020/0269136 A1* 8/2020 Gurumurthy ........ G06V 10/764

* cited by examiner

*Primary Examiner* — Siamak Harandi
(74) *Attorney, Agent, or Firm* — Staas & Halsey LLP

(57) ABSTRACT

A training device and a training method for training a multi-goal model based on goals in a goal space are provided. The training device includes a memory and a processor coupled to the memory. The processor is configured to set the goal space, to acquire a plurality of sub-goal spaces of different levels of difficulty; change a sub-goal space to be processed from a current sub-goal space to a next sub-goal space of a higher level of difficulty; select, as sampling goals, goals at least from the current sub-goal space, and to acquire transitions related to the sampling goals by executing actions; train the multi-goal model based on the transitions, and evaluate the multi-goal model by calculating a success rate for achieving goals in the current sub-goal space.

20 Claims, 6 Drawing Sheets

TRAINING DEVICE AND TRAINING METHOD FOR TRAINING MULTI-GOAL MODEL

CROSS REFERENCE TO RELATED APPLICATION

This application is based on and claims priority under 35 U.S.C. § 119 to Chinese Patent Application No. 201910384143.X filed on May 9, 2019, in the China National Intellectual Property Administration, the disclosure of which is incorporated herein by reference in its entirety.

FIELD

The present disclosure relates to the field of information processing, and in particular to a training device and a training method for training a multi-goal model based on goals in a goal space.

BACKGROUND

Reinforcement learning aims to solve intelligent decision problems. The framework of reinforcement learning includes an agent and an environment. The agent interacts with the environment by determining an optimal action according to its policy and a current state. After executing the action, the environment returns a reward and switches to a new state based on a state transition probability of the environment. Then, the agent optimizes its policy by maximizing an expectation of cumulative rewards.

In conventional multi-goal reinforcement learning methods, such as Hindsight Experience Replay (HER), only a single goal space is utilized to train an agent to solve tasks. Generally, a goal space includes goals of different levels of difficulty. For a goal of a high level of difficulty, few samples for achieving the goal are generated by utilizing the conventional multi-goal reinforcement learning method. Therefore, a long time period and a great number of training samples are required for training the agent to achieve a difficult goal by utilizing the conventional multi-goal reinforcement learning method.

SUMMARY

A brief summary of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts on the present disclosure in a simplified form, as preamble of a detailed description later.

In view of the above problems, an object of the present disclosure is to provide a training device and a training method capable of solving one or more disadvantages in the conventional technology.

According to an aspect of the present disclosure, there is provided a training device, for training a multi-goal model based on goals in a goal space. The training device may include a memory and a processor coupled to the memory. The training device may include a goal space setting unit, a goal space changing unit, a sampling unit, a training unit, and an evaluating unit.

The processor, according to an aspect of the present disclosure, may be configured to set the goal space, to acquire a plurality of sub-goal spaces of different levels of difficulty, and change a sub-goal space to be processed from a current sub-goal space to a next sub-goal space of a higher level of difficulty. The processor is configured to select, as sampling goals, goals at least from the current sub-goal space, and to acquire transitions related to the sampling goals by executing actions, train the multi-goal model based on the transitions, and evaluate the multi-goal model by calculating a success rate for achieving goals in the current sub-goal space. The processor is configured to change, in a case where the success rate is larger than a predetermined threshold, the sub-goal space to be processed from the current sub-goal space to the next sub-goal space of a higher level of difficulty.

According to another aspect of the present disclosure, there is provided a training method, for training a multi-goal model based on goals in a goal space. The training method includes: setting the goal space, to acquire a plurality of sub-goal spaces of different levels of difficulty; selecting, as sampling goals, goals at least from a current sub-goal space, and for acquiring transitions related to the sampling goals by executing actions; training the multi-goal model based on the transitions; evaluating the multi-goal model by calculating a success rate for achieving goals in the current sub-goal space; and changing a sub-goal space to be processed from the current sub-goal space to a next sub-goal space of a higher level of difficulty. In the changing of the sub-goal space, in a case where the success rate is larger than a predetermined threshold, the sub-goal space to be processed is changed from the current sub-goal space to the next sub-goal space of a higher level of difficulty.

According to other aspects of the present disclosure, there are further provided a computer program code and a computer program product for implementing the above training method according to the present disclosure, and a computer-readable storage medium having recorded thereon the computer program code for implementing the above training method according to the present disclosure.

Other aspects of embodiments of the present disclosure are given in the following description, in which, preferred embodiments for fully disclosing the embodiments of the present disclosure are explained in detail without applying restrictions thereon.

BRIEF DESCRIPTION OF THE DRAWINGS

The present disclosure can be better understood by referring to the detailed description given below in conjunction with the drawings. In the drawings, same or similar reference numerals are utilized to represent same or similar components. The drawings, together with the following detailed description, are incorporated in and form a part of this specification to further illustrate preferred embodiments of the present disclosure and explain principles and advantages of the present disclosure. In the drawings.

DETAILED DESCRIPTION OF EMBODIMENTS

Exemplary embodiments of the present disclosure are described below in connection with the drawings. For clarity and conciseness, not all characteristics of an actual embodiment are described in the specification. However, it should be understood that many embodiment-specific decisions, for example, conforming to restrictions related to system and business, must be made when developing any actual embodiment, so as to achieve a specific goal of a developer. These restrictions may vary depending on embodiments. In addition, it should be understood that, although development work may be complex and time-consuming, the development work is merely a routine task for those skilled in the art who benefit from the present disclosure.

Here, it should be further noted that, in order to avoid obscuring the present disclosure due to unnecessary details, the drawings show only device structures and/or processing steps (operations) that are closely related to technical solutions of the present disclosure, and other details have little relevance to the present disclosure are omitted.

Hereinafter, embodiments of the present disclosure are described in detail in connection with the drawings.

Figure 1:
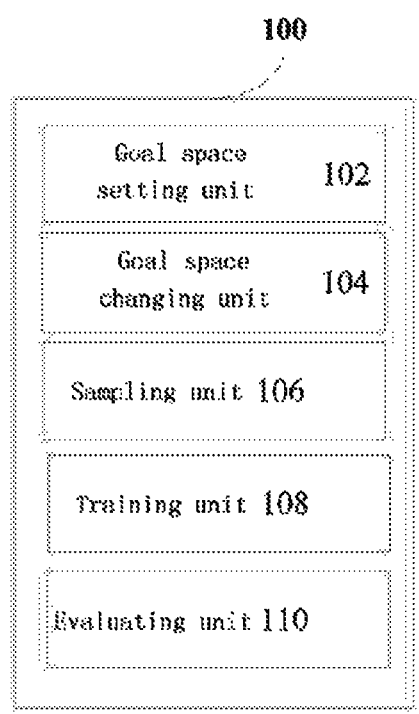
FIG. 1 is a block diagram showing a functional configuration example of a training device according to an embodiment of the present disclosure.

First, a functional configuration example of a training device 100 according to an embodiment of the present disclosure will be described with reference to FIG. 1, which is a block diagram showing the functional configuration example of the training device 100 according to the embodiment of the present disclosure. As shown in FIG. 1, the training device 100 according to the embodiment of the present disclosure may include a goal space setting unit 102, a goal space changing unit 104, a sampling unit 106, a training unit 108, and an evaluating unit 110.

The goal space setting unit 102 may be configured to set a goal space, to acquire a plurality of sub-goal spaces of different levels of difficulty. For example, a level of difficulty of a sub-goal space represents a difficulty for achieving goals in the sub-goal space. For a sub-goal space of a higher level of difficulty, the difficulty for achieving the goals in the sub-goal space is greater.

For illustration rather than limitation, in a training process of training a mechanical arm to lift an object, the level of difficulty of the sub-goal space may be determined based on a lifting height. In addition, for illustration rather than limitation, in a process of training an autonomous driving and/or assisted driving vehicle, the level of difficulty of the sub-goal space may be determined based on a traffic condition of a road. In other training processes, those skilled in the art may determine the level of difficulty of the sub-goal space based on actual needs, which will not be described in detail herein.

The goal space changing unit 104 may be configured to change a sub-goal space to be processed from a current sub-goal space to a next sub-goal space of a higher level of difficulty.

The sampling unit 106 may be configured to select, as sampling goals, goals at least from the current sub-goal space, and to acquire transitions, that is, samples, related to the sampling goals by executing actions.

For example, the sampling unit 106 may interact, for the selected sampling goals, with an environment by executing actions based on a multi-goal model and a noise model, to acquire the transitions related to the sampling goals. For illustration rather than limitation, the noise model may be determined by utilizing an ε-greedy strategy. Those skilled in the art may determine the noise model in other manners based on actual needs, which will not be described in detail herein.

The training unit 108 may be configured to train the multi-goal model (that is, a policy) based on the transitions. For example, the training unit 108 may randomly select transitions for training the multi-goal model or select transitions for training the multi-goal model based on temporal difference errors of the transitions. However, a manner for selecting transitions for training the multi-goal model is not limited thereto.

For illustration rather than limitation, the training unit 108 may be configured to train the multi-goal model based on the transitions by utilizing an HER algorithm. In a case where the multi-goal model is trained by utilizing the HER algorithm, a transition may be represented by a tuple comprising of four items $(s_t\|g, a_t, r_t, s_{t+1}\|g)$, in which $s_t$ represents a state in a time t, $a_t$ represents an action to be executed in the time t, $r_t$ represents a reward obtained by executing the action $a_t$ in the time t, $s_{t+1}$ represents a state in a time t+1, and g represents a sampling goal.

The evaluating unit 110 may be configured to evaluate the multi-goal model by calculating a success rate for achieving goals in the current sub-goal space. For example, the evaluating unit 110 may acquire a plurality of execution results, for example, episodes, by executing actions without noise, to calculate the success rate. In this case, the success rate may be calculated as a ratio of the number of successful episodes to the number of all acquired episodes.

Specifically, at the beginning of the training for the goal space, the sub-goal space to be processed may be set as a sub-goal space of a lowest level of difficulty. In a case where the success rate for achieving goals in the current sub-goal space calculated by the evaluating unit 110 is greater than a predetermined threshold, the goal space changing unit 104 may change the sub-goal space to be processed from the current sub-goal space to a next sub-goal space of a higher level of difficulty. In a case where the success rate for achieving goals in the current sub-goal space calculated by the evaluating unit 110 is not greater than the predetermined threshold, for example, the process for the current sub-goal space may be continued. For example, in a case where the current sub-goal space is a sub-goal space 1 of a level of difficulty equal to 1, when a success rate for achieving goals in the current sub-goal space 1 is greater than the predetermined threshold, the goal space changing unit 104 may change the sub-goal space to be processed from the current sub-goal space 1 to a sub-goal space 2 of a level of difficulty equal to 2, and when the success rate for achieving goals in the current sub-goal space 1 is not greater than the predetermined threshold, for example, the process for the current sub-goal space 1 may be continued.

For illustration rather than limitation, in the case where the success rate for achieving goals in the current sub-goal space is greater than the predetermined threshold, the goal space changing unit 104 may automatically change the sub-goal space to be processed from the current sub-goal space to a next sub-goal space of a higher level of difficulty.

In addition, before process for the next sub-goal space is started, a parameter relevant to the noise model may be re-initialized. For example, in the case where the noise model is determined by utilizing the ε-greedy strategy, ε may be re-initialized to 1.

Figure 2:
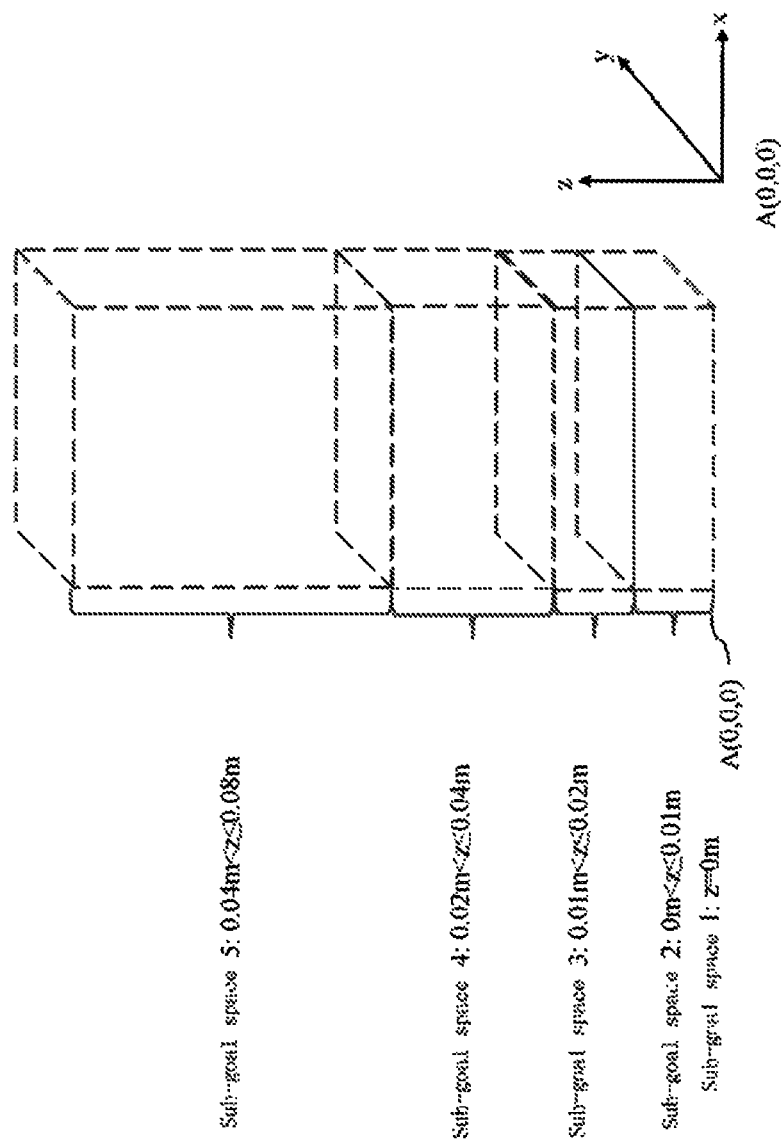
FIG. 2 is a schematic diagram showing an example of dividing a goal space according to an embodiment of the present disclosure.

In an example, the goal space setting unit 102 may be configured to divide the goal space in advance, to acquire a plurality of sub-goal spaces of different levels of difficulty. For example, the goal space setting unit 102 may be configured to divide the goal space in advance, to acquire a sub-goal space 1 of a level of difficulty equal to 1, a sub-goal space 2 of a level of difficulty equal to 2, . . . , and a sub-goal space n of a level of difficulty equal to n, where n is a positive integer greater than or equal to 2. For illustration rather than limitation, in the training process of training the mechanical arm to lift the object, the goal space setting unit 102 may be configured to divide the goal space in advance based on the lifting height, to acquire a plurality of sub-goal spaces of different levels of difficulty. For example, reference is made to FIG. 2, which shows an example of dividing a goal space according to an embodiment of the present disclosure. In FIG. 2, a goal space is divided based on a lifting height z into five sub-goal spaces including: a sub-goal space 1 of a level of difficulty equal to 1 (z=0 m), a sub-goal space 2 of a level of difficulty equal to 2 (0 m<z≤0.01 m), a sub-goal space 3 of a level of difficulty equal to 3 (0.01 m<z≤0.02 m), a sub-goal space 4 of a level of difficulty equal to 4 (0.02 m<z≤0.04 m), and a sub-goal space 5 of a level of difficulty equal to 5 (0.04 m<z≤0.08 m).

In another example, the goal space setting unit 102 may be configured to acquire, in a case where the success rate for achieving goals in the current sub-goal space is larger than the predetermined threshold, the next sub-goal space utilizing goals in the goal space at a predetermined distance from a center of a distribution of achieved goals, by calculating the distribution. In addition, those skilled in the art may set the goal space in other manners, to acquire the plurality of sub-goal spaces of different levels of difficulty, which will not be described in detail herein.

In a case where the goal space setting unit 102 acquires the next sub-goal space utilizing goals in the goal space at a predetermined distance from the center of the distribution of achieved goals, by calculating the distribution, a specific range of the goal space is required to be specified, so as to remove an abnormal value that is not in the goal space while acquiring the next sub-goal space. For example, in the case where the goal space is set as a circle or a sphere, a maximum radius of the goal space is required to be specified, so that an abnormal value at a distance from a center of the goal space greater than the maximum radius is removed while acquiring the next sub-goal space.

For illustration rather than limitation, the predetermined distance may be determined based on the specific range of the goal space. In addition, predetermined distances for acquiring different sub-goal spaces may be identical to or different from each other.

Preferably, the sampling unit 106 may be configured to further select, as the sampling goals, goals from a processed sub-goal space. That is, the sampling unit 106 may be configured to select goals from both the current sub-goal space and the processed sub-goal space as the sampling goals. For example, the processed sub-goal space is a sub-goal space for which a training process has been performed. Preferably, the processed sub-goal space is a sub-goal space for which a training process has been performed, and that a success rate for achieving goals in the sub-goal space is greater than the predetermined threshold. For illustration rather than limitation, in a case where the current sub-goal space is the sub-goal space 3, the sampling unit 106 may be configured to select goals from the current sub-goal space 3 and the processed sub-goal spaces 1 and 2 as the sampling goals. By selecting goals from both the current sub-goal space and the processed sub-goal space as sampling goals, learning can be performed smoothly.

In an example, the sampling unit 106 may be configured to select, as the sampling goals, goals from the current sub-goal space and the processed sub-goal space with a first probability and a second probability respectively. A sum of the first probability and the second probability is 100%. For illustration rather than limitation, the first probability and the second probability may be 50% and 50%, respectively. In addition, those skilled in the art may select other suitable first probabilities and second probabilities based on actual needs.

The training device according to this embodiment of the present disclosure sets a goal space to acquire a plurality of sub-goal spaces of different levels of difficulty, and sequentially processes the plurality of acquired sub-goal spaces based on the levels of difficulty, so that transitions and time required for training a multi-goal model can be reduced, thereby training efficiency can be improved.

Figure 3:
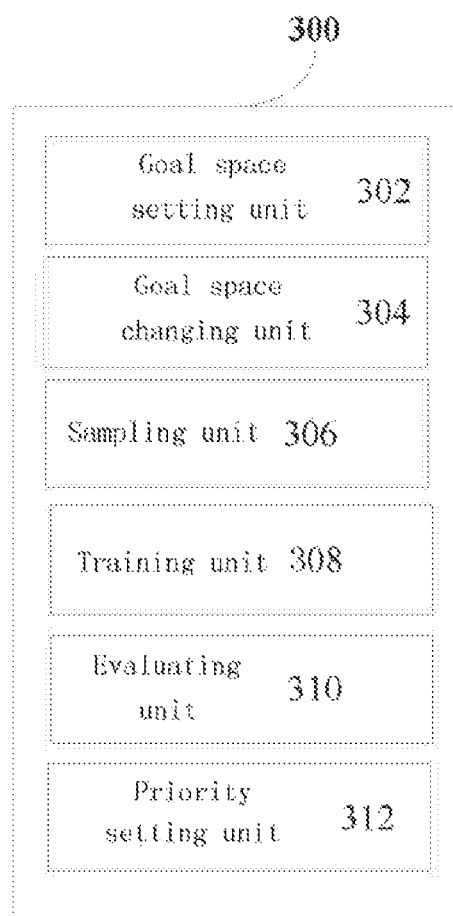
FIG. 3 is a block diagram showing a functional configuration example of a training device according to another embodiment of the present disclosure.

Next, a functional configuration example of a training device 300 according to another embodiment of the present disclosure will be described with reference to FIG. 3, which is a block diagram showing the functional configuration example of the training device 300 according to the other embodiment of the present disclosure. As shown in FIG. 3, the training device 300 according to the other embodiment of the present disclosure may include a goal space setting unit 302, a goal space changing unit 304, a sampling unit 306, a training unit 308, an evaluating unit 310, and a priority setting unit 312.

The goal space setting unit 302, the goal space changing unit 304, the sampling unit 306, and the evaluating unit 310 included in the training device 300 according to this embodiment of the present disclosure are respectively similar to the goal space setting unit 102, the goal space changing unit 104, the sampling unit 106, and the evaluating unit 110 included in the training device 100 according to the above embodiment of the present disclosure, and are not repeated here for brevity.

The priority setting unit 312 may be configured to set priorities for the transitions, such that a transition corresponding to achieving a goal of a higher difficulty coefficient has a higher priority.

In an example, the priority setting unit 312 may be configured to set the priorities of the transitions based on difficulty coefficients of goals corresponding to the transitions. For example, as a difficulty coefficient of a goal corresponding to a transition is greater, a priority of the transition is higher. For example, the difficulty coefficient of the goal corresponding to the transition may be related to a level of difficulty of a sub-goal space including the goal.

Further, goals in a same sub-goal space may have different difficulty coefficients. Accordingly, for example, transitions corresponding to goals in a same sub-goal space may have different priorities. In addition, for example, a difficulty coefficient of each goal in a sub-goal space of a low level of difficulty may be lower than that of any goal in a sub-goal space of a high level of difficulty. Accordingly, for example, a priority of each of transitions corresponding to goals in a sub-goal space of a low level of difficulty may be lower than that of any of transitions corresponding to goals in a sub-goal space of a high level of difficulty.

For illustration rather than limitation, in training process of training a mechanical arm to lift an object, the priority setting unit 312 may be configured to set a priority of a transition based on a goal lifting height corresponding to the transition. For example, the priority setting unit 312 may be configured to set the priority of the transition as the goal lifting height corresponding to the transition. For example, in a case where the goal lifting height corresponding to the transition is 0.01 m, the priority setting unit 312 may set the priority of the transition as 0.01; in a case where the goal lifting height corresponding to the transition is 0.02 m, the priority setting unit 312 may set the priority of the transition as 0.02; in a case where the goal lift height corresponding to the transition is 0.04 m, the priority setting unit 312 may set the priority of the transition as 0.04; in a case where the goal lift height corresponding to the transition is 0.08 m, the priority setting unit 312 may set the priority of the transition as 0.08; and so on.

In another example, the priority setting unit 312 may be configured to set the priorities of the transitions based on temporal difference errors of the transitions and difficulty coefficients of goals corresponding to the transitions. For example, a priority $\mathcal{P}$ of a transition may be calculated from the following equation (1).

$$\mathcal{P} = \lambda \cdot |\delta| + (1-\lambda) \cdot d \tag{1}$$

In equation (1), $\delta$ represents a temporal difference error of a transition, d represents a difficulty coefficient of a goal corresponding to the transition, and $0 \leq \lambda \leq 1$. $\lambda$ may be set based on actual needs. A smaller $\lambda$ indicates a greater determination role of the difficulty coefficient of the goal corresponding to the transition when setting the priority. In a case where $\lambda$ is equal to 0, the priority of the transition is related to only the difficulty coefficient of the goal corresponding to the transition. In a case where $\lambda$ is equal to 1, the priority of transition is related to only the temporal difference error of the transition.

The training unit 308 may select transitions for training the multi-goal model based on the priorities of the transitions. For example, a high priority of a transition corresponds to a great probability that the transition is selected for training the multi-goal model. In an example, the training unit 308 may calculate a priority distribution coefficient of a transition t based on priorities of all transitions related to the current goal space, and select transitions for training the multi-goal model based on the priority distribution coefficient of the transition t. For example, a greater priority distribution coefficient of the transition t corresponds to a greater probability that the transition t is selected for training the multi-goal model. For example, the training unit 308 may calculate a priority distribution coefficient P(t) of the transition t from the following equation (2).

$$\mathcal{P}(t) = \mathcal{P}_t^\alpha / \Sigma_i \mathcal{P}_i^\alpha \tag{2}$$

In equation (2), $\alpha$ represents a priority factor, $\alpha \geq 0$. $\alpha$ may be set based on actual needs. A greater $\alpha$ corresponds to a greater determination role of the priority when selecting transitions for training the multi-goal model. In a case where $\alpha$ is equal to 0, the training unit 308, similar to the training unit 108 in the training device 100 according to the above embodiment of the present disclosure, selects transitions for training the multi-goal model regardless of the priorities of the transitions.

Similar to the training device according to the above embodiment of the present disclosure, the training device according to this embodiment of the present disclosure sets a goal space to acquire a plurality of sub-goal spaces of different levels of difficulty, and sequentially processes the plurality of acquired sub-goal spaces based on the levels of difficulty, so that transitions and time required for training a multi-goal model can be reduced, thereby the training efficiency can be improved. In addition, the training device according to this embodiment of the present disclosure sets priorities for transitions, so that a transition corresponding to achieving a goal of a higher difficulty coefficient has a higher priority, and the training device selects transitions for training the multi goal model based on the priorities of the transitions, so that a transition corresponding to achieving a goal of a higher difficulty coefficient has a greater probability to be selected as a transition for training the multi-goal model, thereby the training efficiency can be further improved.

Corresponding to the above embodiments of the device for training a multi-goal model, embodiments of a method for training a multi goal model are further provided according to the present disclosure.

Figure 4:
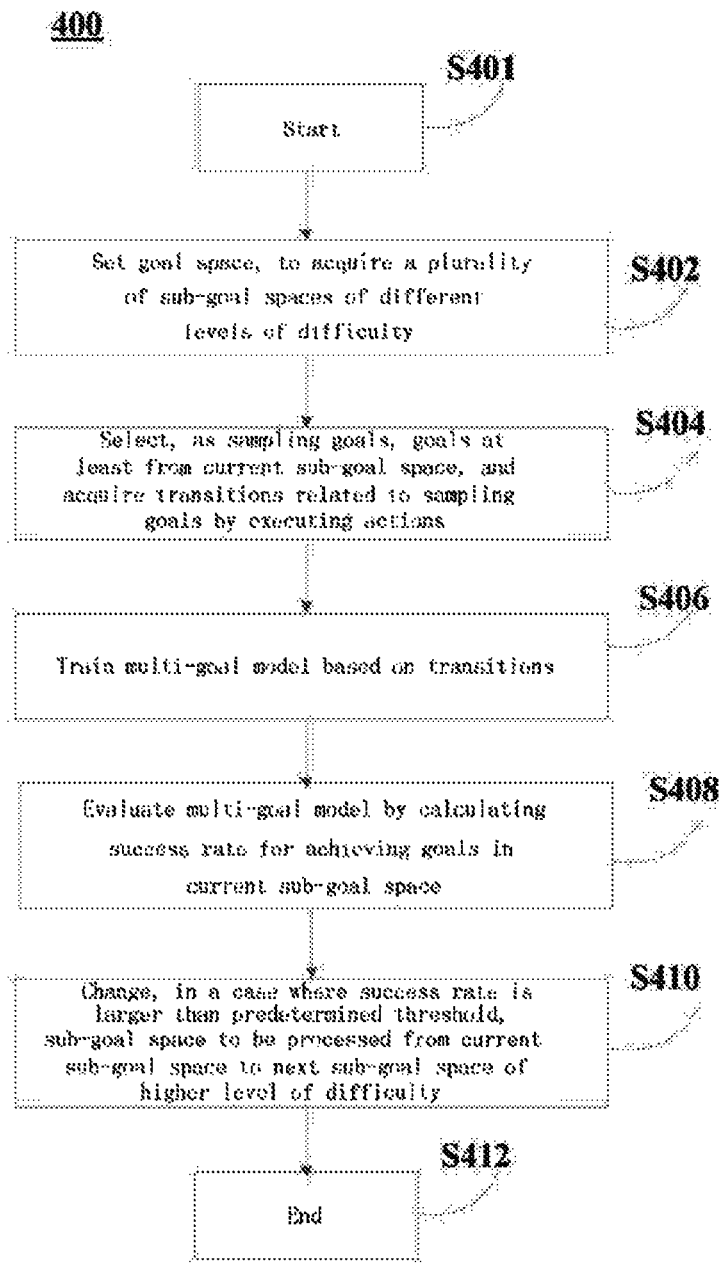
FIG. 4 is a flowchart showing an example of a flow of a training method according to an embodiment of the present disclosure.

FIG. 4 is a flowchart of an example of a flow of a training method 400 according to an embodiment of the present disclosure. As shown in FIG. 4, the training method 400 according to the embodiment of the present disclosure includes a start operation S401, a goal space setting operation S402, a sampling operation S404, a training operation S406, an evaluating operation S408, a goal space changing operation S410, and an end operation S412.

In the goal space setting operation S402, a goal space is set to acquire a plurality of sub-goal spaces of different levels of difficulty. A level of difficulty of a sub-goal space represents a difficulty for achieving goals in the sub-goal space. For a sub-goal space of a higher level of difficulty, the difficulty for achieving the goals in the sub-goal space is greater.

For illustration rather than limitation, in a training process of training a mechanical arm to lift an object, the level of difficulty of the sub-goal space may be determined based on a lifting height. In addition, for illustration rather than limitation, in a process of training an autonomous driving and/or assisted driving vehicle, the level of difficulty of the sub-goal space may be determined based on a traffic condition of a road. In other training processes, those skilled in the art may determine the level of difficulty of the sub-goal space based on actual needs, which will not be described in detail herein.

In the sampling operation S404, goals are selected, as sampling goals, at least from the current sub-goal space, and transitions, that is, samples, related to the sampling goals are acquired by executing actions.

Specifically, in the sampling operation S404, for the selected sampling goals, the transitions related to the sampling goals may be acquired by executing actions based on a multi-goal model and a noise model to interact with an environment. For illustration rather than limitation, the noise model may be determined by utilizing an ε-greedy strategy. Those skilled in the art may determine the noise model in other manners based on actual needs, which will not be described in detail herein.

In the training operation S406, the multi-goal model (that is, a policy) is trained based on the transitions. For example, in the training operation S406, transitions for training the multi-goal model may be randomly selected or may be selected based on temporal difference errors of the transitions. However, a manner for selecting transitions for training the multi goal model is not limited thereto.

For illustration rather than limitation, in the training operation S406, the multi-goal model may be trained based on the transitions by utilizing an HER algorithm. In a case where the multi-goal model is trained by utilizing the HER algorithm, a transition may be represented by a tuple comprising of four items $(s_t \| g, a_t, r_t, s_{t+1} g)$, in which $s_t$ represents a state in a time t, $a_t$ represents an action to be executed in the time t, $r_t$ represents a reward obtained by executing the action $a_t$ in the time t, $s_{t+1}$ represents a state in a time t+1, and g represents a sampling goal.

In the evaluating operation S408, the multi-goal model is evaluated by calculating a success rate for achieving goals in the current sub-goal space. For example, in the evaluating operation S408, actions may be executed without noise to acquire a plurality of execution results, for example, episodes, so as to calculate the success rate. In this case, the success rate may be calculated as a ratio of the number of successful episodes to the number of all acquired episodes.

In the goal space changing operation S410, in a case where the success rate for achieving goals in the current sub-goal space is greater than a predetermined threshold, the sub-goal space to be processed is changed from the current sub-goal space to a next sub-goal space of a higher level of difficulty. In a case where the success rate for achieving goals in the current sub-goal space is not greater than the predetermined threshold, for example, the process for the current sub-goal space may be continued.

Specifically, at the beginning of the training for the goal space, the sub-goal space to be processed may be set as a sub-goal space of a lowest level of difficulty. In a case where the success rate for achieving goals in the current sub-goal space calculated in the evaluating operation S408 is greater than the predetermined threshold, the sub-goal space to be processed may be changed from the current sub-goal space to the next sub-goal space of a higher level of difficulty. For example, in a case where the current sub-goal space is a sub-goal space 1 of a level of difficulty equal to 1, when a success rate for achieving goals in the current sub-goal space 1 is greater than the predetermined threshold, the sub-goal space to be processed may be changed from the current sub-goal space 1 to a sub-goal space 2 of a level of difficulty equal to 2.

For illustration rather than limitation, in the case where the success rate for achieving goals in the current sub-goal space is greater than the predetermined threshold, the sub-goal space to be processed may be automatically changed from the current sub-goal space to a next sub-goal space of a higher level of difficulty.

In addition, before process for the next sub-goal space is started, a parameter relevant to the noise model may be re-initialized. For example, in the case where the noise model is determined by utilizing the ε-greedy strategy, ε may be re-initialized to 1.

In an example, in the goal space setting operation S402, the goal space may be divided in advance, to acquire a plurality of sub-goal spaces of different levels of difficulty. For example, in the goal space setting operation S402, the goal space may be divided in advance, to acquire a sub-goal space 1 of a level of difficulty equal to 1, a sub-goal space 2 of a level of difficulty equal to 2, . . . , and a sub-goal space n of a level of difficulty equal to n, where n is a positive integer greater than or equal to 2. For illustration rather than limitation, in the training process of training the mechanical arm to lift the object, in the goal space setting operation S402, the goal space may be divided in advance based on the lifting height, to acquire a plurality of sub-goal spaces of different levels of difficulty. For example, reference is made to an example of dividing a goal space according to an embodiment of the present disclosure, as shown in FIG. 2.

In another example, in a case where the success rate for achieving goals in the current sub-goal space is larger than the predetermined threshold, in the goal space setting operation S402, the next sub-goal space is acquired by calculating a distribution of achieved goals and utilizing goals in the goal space at a predetermined distance from a center of the distribution. In addition, those skilled in the art may set the goal space in other manners, to acquire a plurality of sub-goal spaces of different levels of difficulty, which will not be described in detail herein.

In a case where the next sub-goal space is acquired by calculating the distribution of achieved goals and utilizing goals in the goal space at a predetermined distance from the center of the distribution, a specific range of the goal space is required to be specified, so as to remove an abnormal value that is not in the goal space while acquiring the next sub-goal space. For example, in the case where the goal space is set as a circle or a sphere, a maximum radius of the goal space is required to be specified, so that an abnormal value at a distance from a center of the goal space greater than the maximum radius is removed while acquiring the next sub-goal space.

For illustration rather than limitation, the predetermined distance may be determined based on the specific range of the goal space. In addition, predetermined distances for acquiring different sub-goal spaces may be identical to or different from each other.

Preferably, in the sampling operation S404, goals are further selected, as the sampling goals, from a processed sub-goal space. That is, in the sampling operation S404, goals are selected from both the current sub-goal space and the processed sub-goal space as the sampling goals. For example, the processed sub-goal space is a sub-goal space for which a training process has been performed. Preferably, the processed sub-goal space is a sub-goal space for which a training process has been performed, and that a success rate for achieving goals in the sub-goal space is greater than the predetermined threshold. For illustration rather than limitation, in a case where the current sub-goal space is the sub-goal space 3, goals may be selected from the current sub-goal space 3 and the processed sub-goal spaces 1 and 2 as the sampling goals. By selecting goals from both the current sub-goal space and the processed sub-goal space as sampling goals, learning can be performed smoothly.

In an example, in the sampling operation S404, goals are selected, as the sampling goals, from the current sub-goal space and the processed sub-goal space with a first probability and a second probability respectively. A sum of the first probability and the second probability is 100%. For illustration rather than limitation, the first probability and the second probability may be 50% and 50%, respectively. In addition, those skilled in the art may select other suitable first probabilities and second probabilities based on actual needs.

With the training method according to this embodiment of the present disclosure, a goal space is set to acquire a plurality of sub-goal spaces of different levels of difficulty, and the plurality of acquired sub-goal spaces are sequentially processed based on the levels of difficulty, so that transitions and time required for training a multi-goal model can be reduced, thereby training efficiency can be improved.

Figure 5:
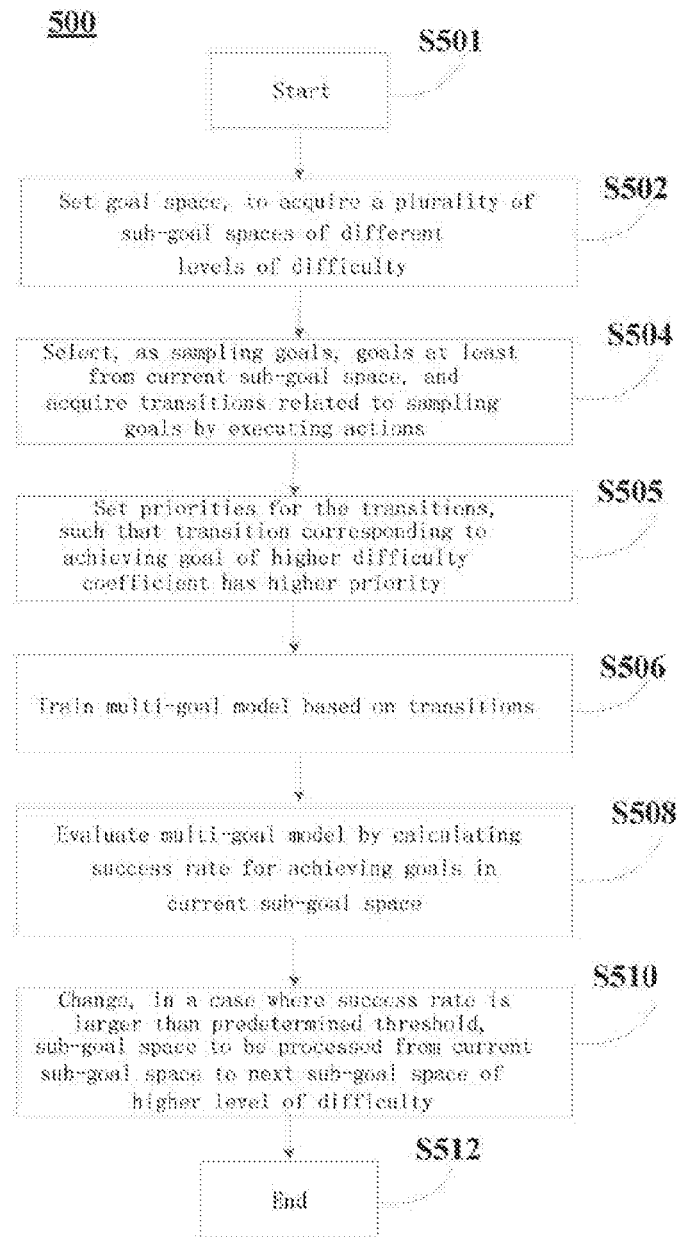
FIG. 5 is a flowchart showing an example of a flow of a training method according to another embodiment of the present disclosure.

Next, an example of a flow of a training method according to another embodiment of the present disclosure will be described with reference to FIG. 5, which is a flowchart of an example of a flow of the training method according to the other embodiment of the present disclosure. As shown in FIG. 5, a training method 500 according to the other embodiment of the present disclosure may include a start operation S501, a goal space setting operation S502, a sampling operation S504, a priority setting operation S505, a training operation S506, an evaluating operation S508, and a goal space changing operation S510 and an end operation S512.

Processing in the goal space setting operation S502, the sampling operation S504, the evaluating operation S508, and the goal space changing operation S510 included in the training method 500 according to this embodiment of the present disclosure is similar to that in the goal space setting operation S402, the sampling operation S404, the evaluating operation S408, and the goal space changing operation S410 included in the training method 400 according to the above embodiment of the present disclosure, and is not repeated here for brevity.

In the priority setting operation S505, priorities are set for the transitions, such that a transition corresponding to achieving a goal of a higher difficulty coefficient has a higher priority.

In an example, in the priority setting operation S505, the priorities of the transitions may be set based on difficulty coefficients of goals corresponding to the transitions. For example, for a greater difficulty coefficient of a goal corresponding to a transition, a priority of the transition is higher. For example, the difficulty coefficient of the goal corresponding to the transition may be related to a level of difficulty of a sub-goal space including the goal. Further, goals in a same sub-goal space may have different difficulty coefficients. Accordingly, for example, transitions corresponding to goals in a same sub-goal space may have different priorities. In addition, for example, a difficulty coefficient of each goal in a sub-goal space of a low level of difficulty may be lower than that of any goal in a sub-goal space of a high level of difficulty. Accordingly, for example, a priority of each of transitions corresponding to goals in a sub-goal space of a low level of difficulty may be lower than that of any of transitions corresponding to goals in a sub-goal space of a high level of difficulty.

In an example, in training process of training a mechanical arm to lift an object, in the priority setting operation S505, a priority of a transition may be set based on a goal lifting height corresponding to the transition. For example, in the priority setting operation S505, the priority of the transition may be set as the goal lifting height corresponding to the transition. For example, in a case where the goal lifting height corresponding to the transition is 0.01 m, the priority of the transition may be set as 0.01; in a case where the goal lifting height corresponding to the transition is 0.02 m, the priority of the transition may be set as 0.02; in a case where the goal lift height corresponding to the transition is 0.04 m, the priority of the transition may be set as 0.04; in a case where the goal lift height corresponding to the transition is 0.08 m, the priority of the transition may be set as 0.08; and so on.

In another example, in the priority setting operation S505, the priorities of the transitions may be set based on temporal difference errors of the transitions and difficulty coefficients of goals corresponding to the transitions. For example, a priority $\mathcal{P}$ of a transition may be calculated from the equation (1) described in the above embodiment of the device.

$\lambda$ may be set based on actual needs. A smaller $\lambda$ indicates a greater determination role of the difficulty coefficient of the goal corresponding to the transition when setting the priority. In a case where $\lambda$ is equal to 0, the priority of the transition is related to only the difficulty coefficient of the goal corresponding to the transition. In a case where $\lambda$ is equal to 1, the priority of transition is related to only the temporal difference error of the transition.

In the training operation S506, transitions for training the multi-goal model may be selected based on the priorities of the transitions. For example, in the training operation S506, a priority distribution coefficient of a transition t may be calculated based on priorities of all transitions related to the current goal space, and transitions for training the multi-goal model are selected based on the priority distribution coefficient of the transition t. For example, a greater priority distribution coefficient P(t) of the transition t corresponds to a greater probability that the transition t is selected for training the multi-goal model. For example, in the training operation S506, the priority distribution coefficient P(t) of the transition t may be calculated from the equation (2) described in the above embodiment of the device.

$\alpha$ may be set based on actual needs. A greater $\alpha$ corresponds to a greater determination role of the priority when selecting transitions for training the multi-goal model. In a case where $\alpha$ is equal to 0, in the training operation S506, transitions for training the multi goal model are selected regardless of the priorities of the transitions, which is similar to that in the training operation S406 in the training method 400 according to the above embodiment of the present disclosure.

Similar to the training method according to the above embodiment of the present disclosure, with the training method according to this embodiment of the present disclosure, a goal space is set to acquire a plurality of sub-goal spaces of different levels of difficulty, and the plurality of acquired sub-goal spaces are sequentially processed based on the levels of difficulty, so that transitions and time required for training a multi-goal model can be reduced, thereby training efficiency can be improved. In addition, with the training method according to this embodiment of the present disclosure, priorities are set for transitions, so that a transition corresponding to achieving a goal of a higher difficulty coefficient has a higher priority, and transitions for training the multi-goal model are selected based on the priorities of the transitions, so that the transition corresponding to achieving the goal of the higher difficulty coefficient has a greater probability to be selected as a transition for training the multi-goal model, thereby the training efficiency can be further improved.

It should be noted that although functional configurations of the training device and operations of the training method according to the embodiments of the present disclosure are described above, the embodiments are for illustration only rather than limitation. Those skilled in the art may modify the above embodiments based on the principles of the present disclosure. For example, functional modules and operations in the embodiments may be added, deleted, or combined, and these modifications fall within the scope of the present disclosure.

In addition, it should be noted that the embodiments of the method correspond to the above embodiments of the device. Content that is not described in detail in the embodiments of the method may refer to the description of the corresponding part in embodiments of the device, and is not repeated here.

In addition, a storage medium and a program product are further provided according to the present disclosure. It should be understood that machine-executable instructions in the storage medium and the program product according to the embodiments of the present disclosure may also be configured to perform the above training method. Therefore, content that is not described in detail here may refer the description of the corresponding part described above, and is not repeated here.

Accordingly, a storage medium for carrying the above program product that includes the machine—executable instructions is also included in the present disclosure. The storage medium includes but is not limited to a floppy disk, an optical disk, a magneto-optical disk, a memory card, a memory stick, and the like.

Figure 6:
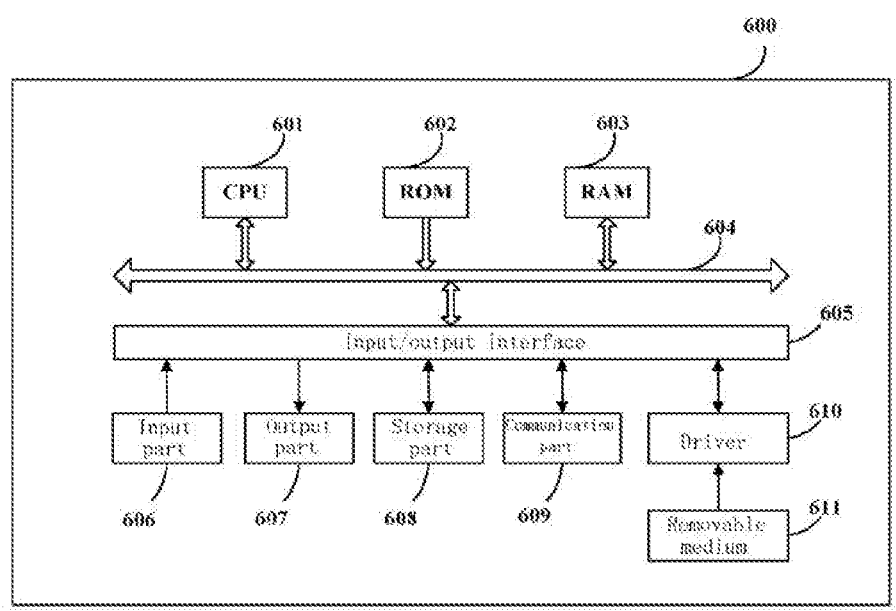
FIG. 6 is a block diagram showing an exemplary structure of a personal computer that may be applied in an embodiment of the present disclosure.

In addition, it should be noted that the above series of processing and the device may be implemented by software and/or firmware. In a case where the above series of processing and the device are implemented by software and/or firmware, a computer having a dedicated hardware structure, for example, a general-purpose personal computer 600 shown in FIG. 6, is installed with a program constituting the software from a storage medium or network. The computer is capable of performing various functions, and the like, when being installed with various programs.

In FIG. 6, a central processing unit (CPU) 601 performs various processing in accordance with a program stored in a read only memory (ROM) 602 or a program loaded from a storage part 608 to a random access memory (RAM) 603. Data required when the CPU 601 performs various processing may also be stored in the RAM 603 as needed.

The CPU 601, the ROM 602, and the RAM 603 are connected to each other via a bus 604. An input/output interface 605 is also connected to the bus 604.

The following components are connected to the input/output interface 605: an input part 606 including a keyboard, a mouse or the like; an output part 607 including a display such as a cathode ray tube (CRT) and a liquid crystal display (LCD), and a speaker or the like; a storage part 608 including a hard disk or the like; and a communication part 609 including a network interface card such as a LAN card, a modem or the like. The communication part 609 performs communication processing via a network such as the Internet.

A driver 610 may also be connected to the input/output interface 605 as needed. A removable medium 611, such as a magnetic disk, an optical disk, a magneto-optical disk, a semiconductor memory or the like, may be installed on the driver 610 as needed, so that a computer program read from the removable medium 611 is installed into the storage part 608 as needed.

In a case where the above series of processing are implemented by software, a program constituting the software is installed from a network such as the Internet, or a storage medium such as the removable medium 611.

Those skilled in the art should understand that the storage medium is not limited to the removable medium 611 shown in FIG. 6 that stores a program and is distributed separately from the device so as to provide the program to the user. The removable medium 611, for example, may include a magnetic disk (including a floppy disk (registered trademark)), an optical disk (including a compact disk read only memory (CD-ROM) and a digital versatile disc (DVD)), a magneto-optical disk (including a minidisc (MD) (registered trademark)), and a semiconductor memory. Alternatively, the storage medium may be a hard disk included in the ROM 602 or the storage part 608, or the like, which has a program stored therein and is distributed to the user together with a device in which the storage medium is included.

The preferred embodiments of the present disclosure are described above with reference to the drawings. However, the present disclosure is not limited to the above embodiments. Those skilled in the art may make various alterna- tions and modifications within the scope of the appended claims. Further, it should be understood that the various alternations and modifications should fall within the technical scope of the present disclosure naturally.

For example, a plurality of functions implemented by one unit in the above embodiments may be implemented by separate devices. Alternatively, a plurality of functions implemented by a plurality of units in the above embodiments may be implemented by separate devices, respectively. In addition, one of the above functions may be implemented by a plurality of units. Such configuration is undoubtedly included in the technical scope of the present disclosure.

In this specification, operations described in the flowchart include not only processing performed in time series in the described order, but also processing performed in parallel or individually rather than having to be performed in time series. Further, even in the operations performed in time series, undoubtedly, the order may be appropriately changed.

In addition, the technology according to the present disclosure may also be configured as follows.

Solution 1. A training device, for training a multi-goal model based on goals in a goal space, the training device including:

a goal space setting unit configured to set the goal space, to acquire a plurality of sub-goal spaces of different levels of difficulty;

a goal space changing unit configured to change a sub-goal space to be processed from a current sub-goal space to a next sub-goal space of a higher level of difficulty;

a sampling unit configured to select, as sampling goals, goals at least from the current sub-goal space, and to acquire transitions related to the sampling goals by executing actions;

a training unit configured to train the multi-goal model based on the transitions; and an evaluating unit configured to evaluate the multi-goal model by calculating a success rate for achieving goals in the current sub-goal space, where the goal space changing unit is configured to change, in a case where the success rate is larger than a predetermined threshold, the sub-goal space to be processed from the current sub-goal space to the next sub-goal space of a higher level of difficulty.

Solution 2. The training device according to Solution 1, where the goal space setting unit is configured to divide the goal space in advance, to acquire the plurality of sub-goal spaces of different levels of difficulty.

Solution 3. The training device according to Solution 1, where the goal space setting unit is configured to acquire, in a case where the success rate is larger than the predetermined threshold, the next sub-goal space utilizing goals in the goal space at a predetermined distance from a center of a distribution of achieved goals, by calculating the distribution.

Solution 4. The training device according to any one of Solutions 1 to 3, where the sampling unit is configured to further select, as the sampling goals, goals from a processed sub-goal space.

Solution 5. The training device according to Solution 4, where the sampling unit is configured to select, as the sampling goals, goals from the current sub-goal space and the processed sub-goal space with a first probability and a second probability respectively, and where a sum of the first probability and the second probability is 100%.

Solution 6. The training device according to any one of Solutions 1 to 3, where the training device further includes a priority setting unit configured to set priorities for the transitions, such that a transition corresponding to achieving a goal of a higher difficulty coefficient has a higher priority, where the training unit is configured to select transitions for training the multi-goal model based on the priorities of the transitions.

Solution 7. The training device according to Solution 6, where the priority setting unit sets the priorities of the transitions based on temporal difference errors of the transitions and difficulty coefficients of goals corresponding to the transitions.

Solution 8. The training device according to Solution 6, where the priority setting unit sets the priorities of the transitions, based on difficulty coefficients of goals corresponding to the transitions.

Solution 9. The training device according to Solution 4, where the training device further includes a priority setting unit configured to set priorities for the transitions, such that a transition corresponding to achieving a goal of a higher difficulty coefficient has a higher priority, where the training unit is configured to select transitions for training the multi-goal model based on the priorities of the transitions.

Solution 10. The training device according to Solution 9, where the priority setting unit sets the priorities of the transitions based on temporal difference errors of the transitions and difficulty coefficients of goals corresponding to the transitions.

Solution 11. The training device according to Solution 9, where the priority setting unit sets the priorities of the transitions based on difficulty coefficients of goals corresponding to the transitions.

Solution 12. A training method, for training a multi-goal model based on goals in a goal space, the method including:

a goal space setting step for setting the goal space, to acquire a plurality of sub-goal spaces of different levels of difficulty;

a sampling step for selecting, as sampling goals, goals at least from a current sub-goal space, and for acquiring transitions related to the sampling goals by executing actions;

a training step for training the multi-goal model based on the transitions;

an evaluating step for evaluating the multi-goal model by calculating a success rate for achieving goals in the current sub-goal space; and a goal space changing step for changing a sub-goal space to be processed from the current sub-goal space to a next sub-goal space of a higher level of difficulty;

where in the goal space changing step, in a case where the success rate is larger than a predetermined threshold, the sub-goal space to be processed is changed from the current sub-goal space to the next sub-goal space of a higher level of difficulty.

Solution 13. The training method according to Solution 12, where in the goal space setting step, the goal space is divided in advance, to acquire the plurality of sub-goal spaces of different levels of difficulty.

Solution 14. The training method according to Solution 12, where in a case where the success rate is larger than the predetermined threshold, in the goal space setting step, the next sub-goal space is acquired by calculating a distribution of achieved goals and utilizing goals in the goal space at a predetermined distance from a center of the distribution.

Solution 15. The training method according to any one of Solutions 12 to 14, where in the sampling step, goals are further selected from a processed sub-goal space as the sampling goals.

Solution 16. The training method according to Solution 15, where in the sampling step, goals are selected, as the sampling goals, from the current sub-goal space and the processed sub-goal space with a first probability and a second probability respectively, and where a sum of the first probability and the second probability is 100%.

Solution 17. The training method according to any one of Solutions 12 to 14, where the training method further includes a priority setting step for setting priorities for the transitions, such that a transition corresponding to achieving a goal of a higher difficulty coefficient has a higher priority, where in the training step, transitions for training the multi-goal model are selected based on the priorities of the transitions.

Solution 18. The training method according to Solution 17, where in the priority setting step, the priorities of the transitions are set based on temporal difference errors of the transitions and difficulty coefficients of goals corresponding to the transitions.

Solution 19. The training method according to Solution 17, where in the priority setting step, the priorities of the transitions are set based on difficulty coefficients of goals corresponding to the transitions.

Solution 20. A computer-readable storage medium storing program instructions that, when being executed by a computer, are utilized for performing the method described in any one of Solutions 12 to 19.

Although the present disclosure has been disclosed above through the description for specific embodiments of the present disclosure, it should be understood that those skilled in the art can make various modifications, improvements or equivalents to the present disclosure within the spirit and scope of the appended claims. These modifications, improvements or equivalents should also be considered to be included in the protection scope of the present disclosure.

What is claimed is:

1. A training device, for training a multi-goal model based on goals in a goal space, the training device comprising:

a memory; and a processor coupled to the memory and configured to:
set the goal space, to acquire a plurality of sub-goal spaces of different levels of difficulty;
change a sub-goal space to be processed from a current sub-goal space to a next sub-goal space of a higher level of difficulty;
select, as sampling goals, goals at least from the current sub-goal space, and acquire transitions related to the sampling goals by executing actions;
train the multi-goal model based on the transitions acquired; and
evaluate the multi-goal model by calculating a success rate for achieving goals in the current sub-goal space,
wherein the processor is configured to change, in a case where the success rate is larger than a predetermined threshold, the sub-goal space to be processed from the current sub-goal space to the next sub-goal space of a higher level of difficulty.

2. The training device according to claim 1, wherein the processor is configured to divide the goal space in advance, to acquire the plurality of sub-goal spaces of different levels of difficulty.

3. The training device according to claim 1, wherein the processor is configured to acquire, in a case where the success rate is larger than the predetermined threshold, the next sub-goal space utilizing goals in the goal space represented at a predetermined distance from a center of a distribution of achieved goals, by calculating the distribution.

4. The training device according to claim 1, wherein the processor is configured to further select, as the sampling goals, goals from a processed sub-goal space.

5. The training device according to claim 4, wherein the processor is configured to select, as the sampling goals, goals from the current sub-goal space and the processed sub-goal space with a first probability and a second probability, respectively, and
wherein a sum of the first probability and the second probability is 100%.

6. The training device according to claim 1, wherein the processor is further configured to:
set priorities for the transitions, such that a transition corresponding to achieving a goal of a higher difficulty coefficient has a higher priority, and
select transitions for training the multi-goal model based on the priorities of the transitions.

7. The training device according to claim 6, wherein the processor sets the priorities of the transitions, based on temporal difference errors of the transitions and difficulty coefficients of goals corresponding to the transitions.

8. The training device according to claim 6, wherein the processor sets the priorities of the transitions, based on difficulty coefficients of goals corresponding to the transitions.

9. A training method, for training a multi-goal model based on goals in a goal space, the method comprising:
setting the goal space, to acquire a plurality of sub-goal spaces of different levels of difficulty;
selecting, as sampling goals, goals at least from a current sub-goal space, and acquiring transitions related to the sampling goals by executing actions;
training the multi-goal model based on the transitions acquired;
evaluating the multi-goal model by calculating a success rate for achieving goals in the current sub-goal space; and
changing a sub-goal space to be processed from the current sub-goal space to a next sub-goal space of a higher level of difficulty;
wherein in the changing of the sub-goal space, in a case where the success rate is larger than a predetermined threshold, the sub-goal space to be processed is changed from the current sub-goal space to the next sub-goal space of a higher level of difficulty.

10. The training method according to claim 9, wherein in the setting of the goal space, the goal space is divided in advance, to acquire the plurality of sub-goal spaces of different levels of difficulty.

11. The training method according to claim 9, wherein in a case where the success rate is larger than the predetermined threshold, in the setting of the goal space, the next sub-goal space is acquired by calculating a distribution of achieved goals and utilizing goals in the goal space represented at a predetermined distance from a center of the distribution.

12. The training method according to claim 9, wherein in the selecting of goals, goals are further selected from a processed sub-goal space as the sampling goals.

13. The training method according to claim 12, wherein in the selecting of goals, goals are selected, as the sampling goals, from the current sub-goal space and the processed sub-goal space with a first probability and a second probability respectively, and wherein a sum of the first probability and the second probability is 100%.

14. The training method according to claim 9, wherein the method further comprises:
setting priorities for the transitions, such that a transition corresponding to achieving a goal of a higher difficulty coefficient has a higher priority,
wherein in the training of the multi-goal model, transitions for training the multi-goal model are selected based on the priorities of the transitions.

15. The training method according to claim 14, wherein in the setting of priorities, the priorities of the transitions are set based on temporal difference errors of the transitions and difficulty coefficients of goals corresponding to the transitions.

16. The training method according to claim 14, wherein in the setting of priorities, the priorities of the transitions are set based on difficulty coefficients of goals corresponding to the transitions.

17. A non-transitory computer-readable storage medium storing program instructions that, when being executed by a computer, are utilized for performing a training method for training a multi-goal model based on goals in a goal space, the method comprising:
setting the goal space, to acquire a plurality of sub-goal spaces of different levels of difficulty;
selecting, as sampling goals, goals at least from a current sub-goal space, and acquiring transitions related to the sampling goals by executing actions;
training the multi-goal model based on the transitions acquired;
evaluating the multi-goal model by calculating a success rate for achieving goals in the current sub-goal space; and
changing a sub-goal space to be processed from the current sub-goal space to a next sub-goal space of a higher level of difficulty;
wherein in the changing of the sub-goal space, in a case where the success rate is larger than a predetermined threshold, the sub-goal space to be processed is changed from the current sub-goal space to the next sub-goal space of a higher level of difficulty.

18. The non-transitory computer-readable storage medium according to claim 17, wherein in the setting of the goal space, the goal space is divided in advance, to acquire the plurality of sub-goal spaces of different levels of difficulty.

19. The non-transitory computer-readable storage medium according to claim 17, wherein in the selecting of goals, goals are further selected from a processed sub-goal space as the sampling goals.

20. The non-transitory computer-readable storage medium according to claim 17, wherein the method further comprises:
setting priorities for the transitions, such that a transition corresponding to achieving a goal of a higher difficulty coefficient has a higher priority,
wherein in the training, transitions for training the multi-goal model are selected based on the priorities of the transitions.

* * * * *